US011249647B2

(12) United States Patent
Mummidi et al.

(10) Patent No.: US 11,249,647 B2
(45) Date of Patent: *Feb. 15, 2022

(54) SUSPEND, RESTART AND RESUME TO UPDATE STORAGE VIRTUALIZATION AT A PERIPHERAL DEVICE

(71) Applicant: Amazon Technologies, Inc., Seattle, WA (US)

(72) Inventors: Raviprasad Venkatesha Murthy Mummidi, Mountain View, CA (US); Matthew Shawn Wilson, Bainbridge Island, WA (US); Anthony Nicholas Liguori, Bainbridge Island, WA (US); Nafea Bshara, San Jose, CA (US); Saar Gross, Binyamina (IL); Jaspal Kohli, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/435,372

(22) Filed: Jun. 7, 2019

(65) Prior Publication Data
US 2019/0294328 A1 Sep. 26, 2019

Related U.S. Application Data

(63) Continuation of application No. 15/279,352, filed on Sep. 28, 2016, now Pat. No. 10,318,162.

(51) Int. Cl.
G06F 3/06 (2006.01)
G06F 12/14 (2006.01)
(Continued)

(52) U.S. Cl.
CPC ............ G06F 3/061 (2013.01); G06F 3/067 (2013.01); G06F 3/0623 (2013.01);
(Continued)

(58) Field of Classification Search
CPC ...... G06F 3/061; G06F 3/0623; G06F 3/0659; G06F 3/0665; G06F 3/0688;
(Continued)

(56) References Cited

U.S. PATENT DOCUMENTS 6,185,629 B1 * 2/2001 Simpson ............. G06F 12/0215
710/10
10,318,162 B2 * 6/2019 Mummidi ............... G06F 3/067
(Continued)

FOREIGN PATENT DOCUMENTS

WO 2016056140 4/2016

OTHER PUBLICATIONS

"The Performance Impact of NVMe and NVMe over Fabrics", Cisco, EMC and Intel, SNIA Ethernet Storage Forum, Nov. 13, 2014, pp. 1-31.

(Continued)

Primary Examiner — Hong C Kim
(74) Attorney, Agent, or Firm — Robert C. Kowert; Kowert, Hood, Munyon, Rankin & Goetzel, P.C.

(57) ABSTRACT

A peripheral device may implement storage virtualization for non-volatile storage devices connected to the peripheral device. A host system connected to the peripheral device may host one or multiple virtual machines. The peripheral device may implement different virtual interfaces for the virtual machines or the host system that present a storage partition at a non-volatile storage device to the virtual machine or host system for storage. Access requests from the virtual machines or host system are directed to the respective virtual interface at the peripheral device. The peripheral device may perform data encryption or decryption, or may perform throttling of access requests. The peripheral device may generate and send physical access requests to perform the access requests received via the virtual interfaces to the
(Continued)

non-volatile storage devices. Completion of the access requests may be indicated to the virtual machines via the virtual interfaces.

20 Claims, 9 Drawing Sheets

(51) Int. Cl.
*G06F 13/20* (2006.01)
*G06F 13/40* (2006.01)

(52) U.S. Cl.
CPC .......... *G06F 3/0644* (2013.01); *G06F 3/0655* (2013.01); *G06F 3/0659* (2013.01); *G06F 3/0664* (2013.01); *G06F 3/0665* (2013.01); *G06F 3/0688* (2013.01); *G06F 12/1408* (2013.01); *G06F 13/20* (2013.01); *G06F 13/4004* (2013.01); *G06F 2212/401* (2013.01); *G06F 2212/402* (2013.01)

(58) Field of Classification Search
CPC .... G06F 3/0644; G06F 3/0655; G06F 3/0664; G06F 3/067; G06F 12/1408; G06F 13/20; G06F 13/4004; G06F 2212/401; G06F 2212/402
USPC ............... 711/154, 6; 710/36, 260; 717/168; 713/100; 709/203; 718/100
See application file for complete search history.

(56) References Cited

U.S. PATENT DOCUMENTS

| | | | | |
|---|---|---|---|---|
| 10,795,708 | B1* | 10/2020 | Grechishkin | G06F 3/067 |
| 2008/0040519 | A1* | 2/2008 | Starr | H04L 69/161 |
| | | | | 710/39 |
| 2009/0037672 | A1 | 2/2009 | Colbert et al. | |
| 2009/0082894 | A1* | 3/2009 | Pettus | G05B 19/418 |
| | | | | 700/105 |
| 2010/0138641 | A1* | 6/2010 | Chang | G06F 9/4418 |
| | | | | 713/2 |
| 2014/0053151 | A1 | 2/2014 | Heninger et al. | |
| 2014/0237475 | A1* | 8/2014 | Jong | G06F 1/3206 |
| | | | | 718/102 |
| 2014/0258603 | A1 | 9/2014 | Karamcheti et al. | |
| 2014/0306974 | A1 | 10/2014 | Vandoros | |
| 2015/0058580 | A1 | 2/2015 | Lagar Cavilla et al. | |
| 2015/0178097 | A1* | 6/2015 | Russinovich | G06F 9/442 |
| | | | | 713/2 |
| 2016/0099948 | A1 | 4/2016 | Ott et al. | |
| 2016/0162279 | A1* | 6/2016 | Zamir | G06F 8/65 |
| | | | | 717/170 |
| 2016/0170785 | A1 | 6/2016 | Liguori et al. | |
| 2016/0285852 | A1* | 9/2016 | Seliger | H04L 67/146 |
| 2016/0350099 | A1* | 12/2016 | Suparna | G06F 11/368 |
| 2017/0131920 | A1 | 5/2017 | Oshins et al. | |
| 2017/0197840 | A1* | 7/2017 | Showalter | B01J 8/0278 |
| 2017/0277470 | A1 | 9/2017 | Kiyota et al. | |
| 2017/0286153 | A1* | 10/2017 | Bak | G06F 9/542 |
| 2018/0136961 | A1* | 5/2018 | Liguori | G06F 8/656 |

OTHER PUBLICATIONS

Invitation to Pay Additional Fees from PCT/US2017/053869, dated Nov. 16, 2017, Amazon Technologies, Inc., pp. 1-13.
International Search Report and Written Opinion from PCT/US2017/053869, dated Jan. 17, 2018, Amazon Technologies, Inc., pp. 1-17.
Office Action dated Sep. 3, 2021 in Chinese patent application No. 201780059898.1, Amazon Technologies, Inc. (pp. 1-24 including translation).
Roberts, David, et al, "NMI: A new memory interface to enable innovation," 2015 IEEE Hot Chips 27 Symposium (HCS), Aug. 22, 2015, pp. 1-1, IEEE.
Xu Jianxi, Lu Hongtao, Feng Dan, "Design and study of virtual-interface-based memory network adapter," Journal of Huazhong University of Science and Technology, edition of Natural Science, Dec. 2005, pp. 146-149, vol. 33.

* cited by examiner

SUSPEND, RESTART AND RESUME TO UPDATE STORAGE VIRTUALIZATION AT A PERIPHERAL DEVICE

This application is a continuation of U.S. patent application Ser. No. 15/279,352, filed Sep. 28, 2016, which is hereby incorporated by reference herein in its entirety.

BACKGROUND

The demand for computing services continues to drive development to increase the capabilities of hardware resources to accommodate the demand. However replacing entire sets of hardware resources in order to acquire the latest technological capabilities (e.g., replacing entire servers or racks of servers) can be very costly. Peripheral devices provide a cost effect way to expand the capabilities of fixed computing resources. For instance, without peripheral devices, a server would be limited to the built in capabilities on the server motherboard (e.g., built-in memory, processors, and other computing resources). By installing peripheral devices in expansion interfaces (e.g., PCI or PCIe slots), the capability of the server may be increased. A graphics card, network interface card, additional memory, or device controllers or interfaces for storage, for example, may be added to enhance the functionality of the server. Moreover, newer peripheral devices with greater performance capabilities may be more cost effective to install and replace existing peripheral devices. Thus, peripheral devices are key to satisfying computing service demand by providing cost effective upgrades to existing hardware resources.

Figure 1:
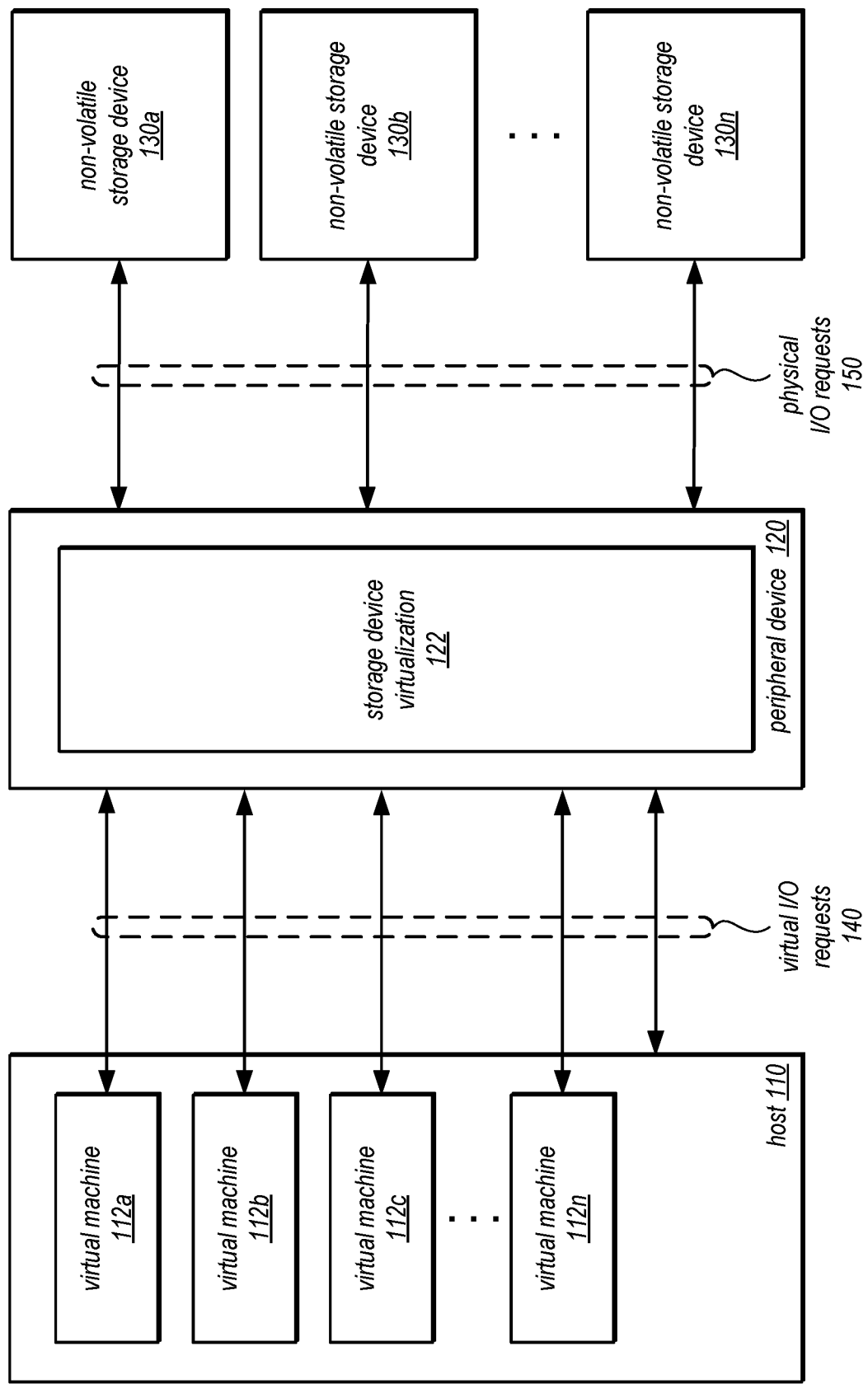
FIG. 1 illustrates a logical block diagram of virtualizing non-volatile storage at a peripheral device, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement virtualizing non-volatile storage at a peripheral device. Computing resources, such as various kinds of servers, computers, and other computing devices may utilize peripheral devices to expand the capabilities of the computing resources beyond that which the underlying hardware of the computing resources can provide. Thus, additional graphics processing capabilities, network processing capabilities, storage processing capabilities, or other computing capabilities may be changed as result of installing peripheral devices. For example, computing resources may be implemented virtually as a virtual machine. In order to provide virtual machines with access to underlying hardware, a host system may implement virtualization management to access the underlying hardware. For example, various techniques for sharing processing resources, networking resources, and other computing resources, such as storage have been developed.

As different resource capabilities change, virtualization techniques must keep pace with the changes so that virtual machines are able to fully leverage the capabilities of underlying hardware. For instance, persistent storage resources that offer persistent, block-based storage to virtual machines have changed to include non-mechanical storage access techniques. For example solid state drives (SSDs) implement arrays of flash memory cells to store data so that accessing the data is not limited by the speed of a mechanical reader (as is the case with disc-based storage devices). While virtualization techniques are able to provide access to new storage devices such as SSDs or other non-volatile storage devices that do not rely upon mechanical access mechanisms, improved interface specifications for accessing non-volatile storage devices that take advantage of the faster access capabilities of non-volatile storage devices are not yet optimally accounted for in storage virtualization. Instead of relying upon improvements to a host system to offer improved virtualization techniques for leveraging improved interface specifications, such as non-volatile memory express (NVMe), a peripheral device may provide storage virtualization for non-volatile storage, in various embodiments. In this way, the capabilities of the host system may be expanded without having to modify existing virtualization techniques, or in some embodiments, all virtualization or management may be shifted to one or more peripheral devices so that the host system operates a user's desired software stack without having to implement virtualization for hardware resources. Moreover, by making the storage virtualization independent at the peripheral device, the peripheral device can be easily updated when new storage interface specifications and/or new non-volatile storage devices become available.

FIG. 1 illustrates a logical block diagram of virtualizing non-volatile storage at a peripheral device, according to some embodiments. Peripheral device 120 may implement storage device virtualization 122 so that different respective virtual machines 112 on a host 110 (or host 110 operating directly under the control of an operating system without virtual machines) can submit virtual I/O requests 140 that leverage the capabilities of high-speed interface specifications with non-volatile storage devices 130. For example, storage device virtualization may implement individual virtual interfaces (as discussed below with regard to FIGS. 3-6) in order to present to a virtual machine an interface that appears as a storage partition (e.g., a formatted and allocated portion of storage, such as a partition) to the virtual machine that may be treated as if it were a controller of a storage device directly connected to the host (instead of connected to peripheral device 120 which is connected to host 110). For example, if peripheral device 120 is connected to host 110 via peripheral component interconnect express (PCIe), then a virtual interface may be created by utilizing single root input/output virtualization (SR-IOV) to create a virtual function that mirrors the interface that would be exposed by a controller for non-volatile storage devices 130. In this way, the storage device virtualization may provide a common interface that can be easily utilized by virtual machines 112 (or directly by host 110, as indicated by the arrow between host 110 and peripheral device 120) while the idiosyncrasies of interfacing with individual back-end non-volatile storage devices 130 (which may have interfaces that vary slightly from manufacturer to manufacturer even if the generally conformation to an interface specification) may be handled by storage device virtualization 122. The virtual interfaces of storage device virtualization 122 may then submit physical I/O requests 150 to perform the virtual I/O requests while maintaining isolation between different virtual machines 112.

Storage device virtualization 122 may be stateless so that no data is persistently maintained on the peripheral device. In this way, storage device virtualization 122 does not have to implement consistency mechanisms between data that is submitted from host 110 and non-volatile storage devices 130 (as no data is ever considered persistent that is only present on peripheral device 120). Stateless implementation may also prevent potential data theft by physically removing the peripheral device as no data is persistently stored on peripheral device 120.

Figure 4:
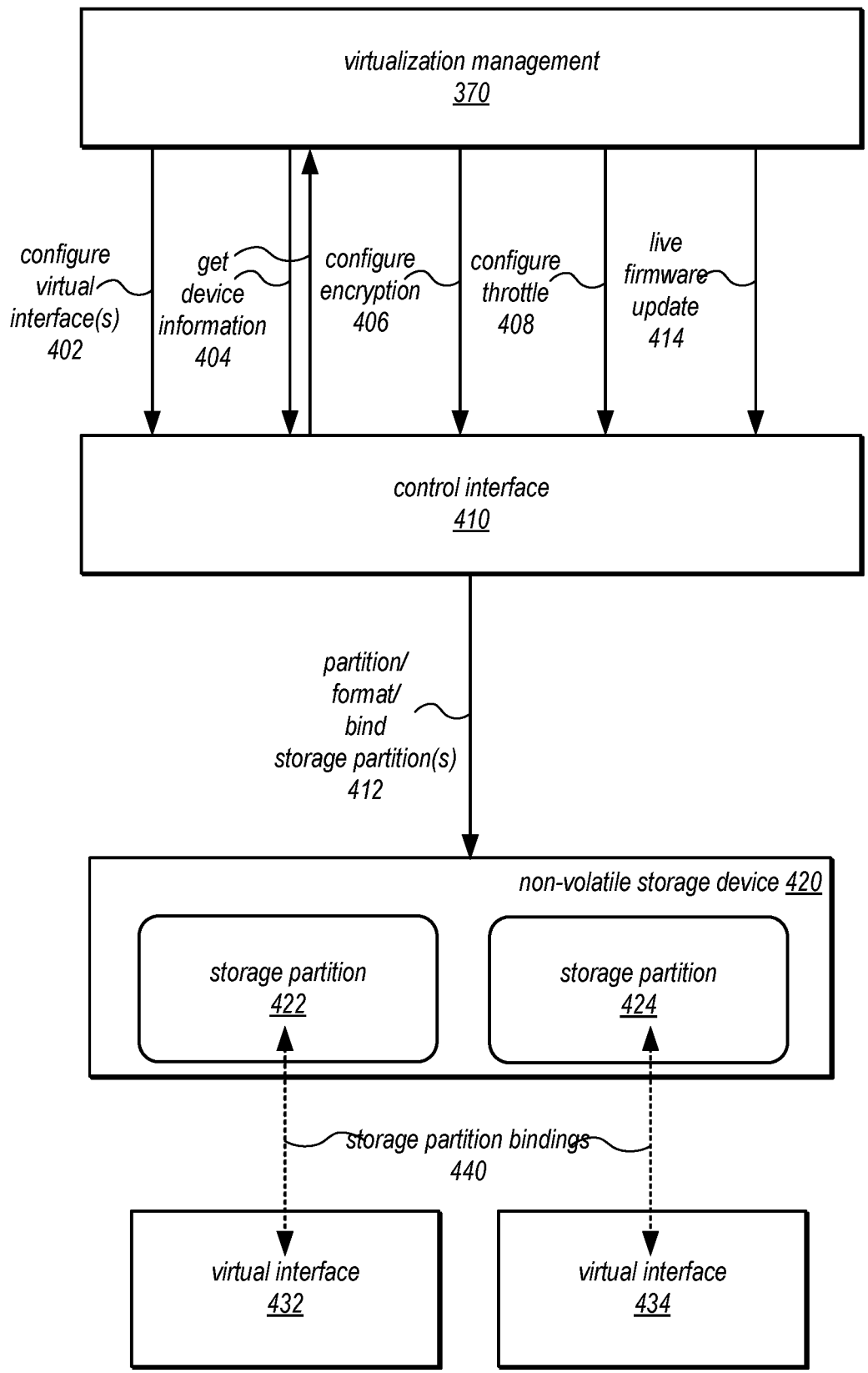
FIG. 4 is a logical block diagram that illustrates control interactions between a host, a peripheral device, and non-volatile storage devices that are virtualized by the peripheral device, according to some embodiments.

Peripheral device 120 may include configurations of hardware and/or software components, (e.g., one or more general or specialized processors (e.g., multicore processor(s)), a host interface bus, a memory, a network interface, and an internal I/O interface) implemented to provide storage device virtualization 122, such as discussed below in FIGS. 4-6. In some embodiments, the peripheral device 120 may provide additional features, such as transparent encryption (from the perspective of the virtual machines 112 and/or the host 110), transparent compression, or any other transparent modification to data that is stored in non-volatile storage devices and I/O request throttling for individual virtual machines. In addition to a virtual interface, storage device virtualization 122 may include a control interface, such as discussed below with regard to FIG. 4, which can allow for the host to perform administrative or configuration operations with respect to non-volatile storage devices 130 or storage device virtualization 122.

Please note that previous descriptions are not intended to be limiting, but are merely provided as an example of storage virtualization at a peripheral device. Various types of peripheral devices, hosts systems, and virtual machines may be implemented as well as different I/O requests may be performed other than those given in the examples discussed above.

This specification begins with a general description of a provider network, which may implement resource hosts for resources that utilize peripheral devices to implement virtualization for non-volatile storage, such as virtual compute instances offered via a virtual compute service. Then various examples of a resource host and peripheral device are discussed, including different components/modules, or arrangements of components/module that may be employed as part of alternative event reporting for the peripheral devices. A number of different methods and techniques to implement virtualization of non-volatiles storage device at a peripheral device are then discussed, some of which are illustrated in accompanying flowcharts. Finally, a description of an example computing system upon which the various hosts, components, modules, systems, devices, and/or nodes may be implemented is provided. Various examples are provided throughout the specification.

Figure 2:
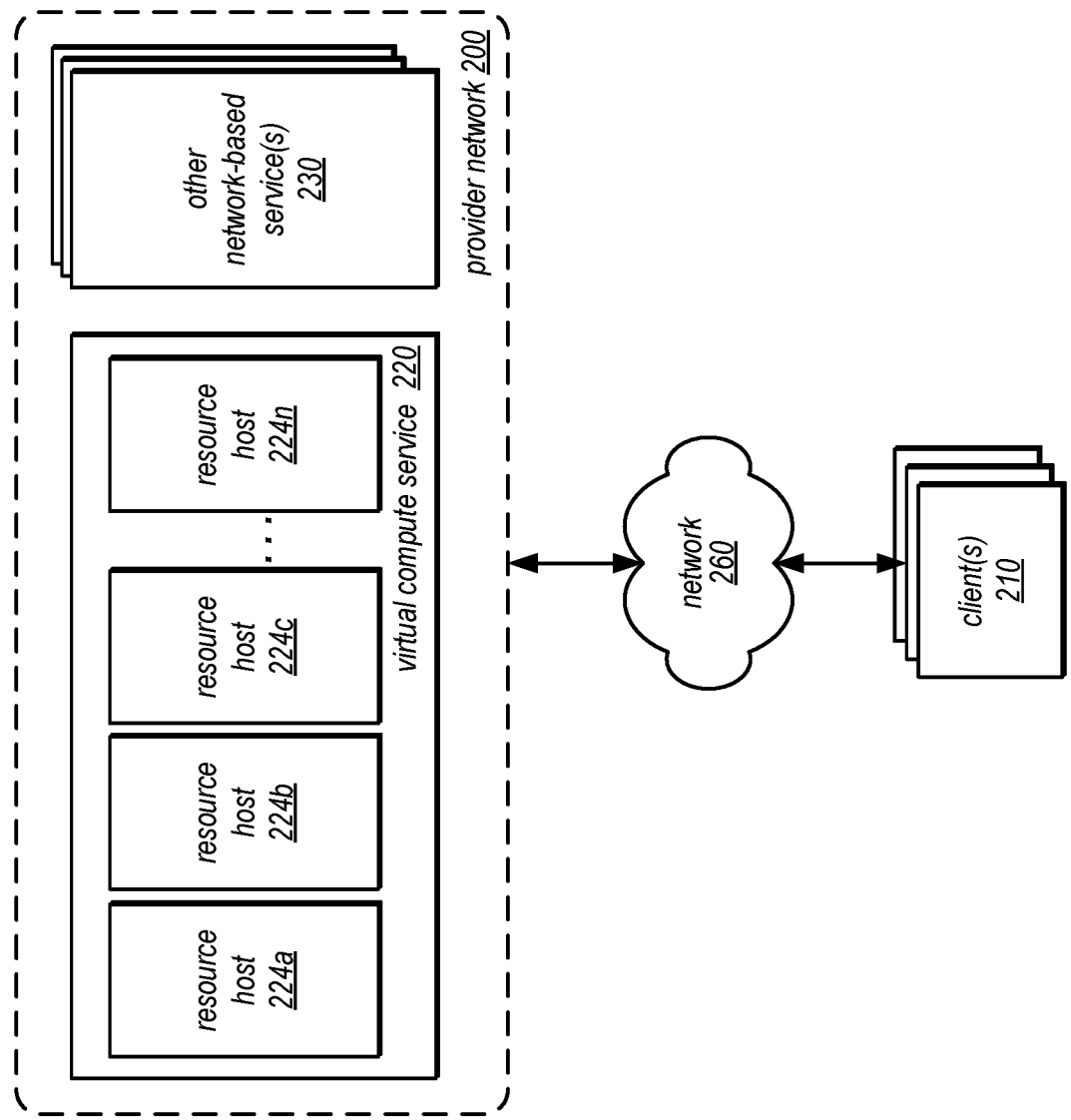
FIG. 2 is a block diagram illustrating a provider network implementing multiple network-based services including resource hosts that utilize peripheral devices to provide virtualization of non-volatiles storage devices implemented at the resource hosts, according to some embodiments.

FIG. 2 is a block diagram illustrating a provider network implementing multiple network-based services including resource hosts that utilize peripheral devices to provide virtualization of non-volatiles storage devices implemented at the resource hosts, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200.

In some embodiments, provider network 200 may provide computing resources, such as virtual compute service 220, storage services, such as a block-based storage service and other storage services 230 (which may include various storage types such as object/key-value based data stores or various types of database systems and/or any other type of network-based service. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, which may make use of non-volatile storage devices local to resources hosts implementing an instance (e.g., storage devices connected directly to a peripheral device which is also directly connected to resource host processing hardware).

As noted above, virtual compute service 220 may offer various compute instances to clients 210. Virtual compute service 220 may implement various resource hosts 224 (e.g., servers or other computing devices such as described below with regard to FIG. 9) which provide various physical computing resources which virtual compute instances utilize to operate. Resource hosts may host one or multiple types of virtual compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes or resources provided by other network-based services 230.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs. In at least some embodiments, a type of compute instances may be offered that utilizes local non-volatile storage devices over a high-speed interface, such as non-volatile memory express (NVMe), as discussed below with regard to FIGS. 3-6.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

In addition to providing virtual compute instances, in some embodiments virtual computing service 220 may offer "bare metal" instances, which directly operate or control a resource host with no other instances or virtualization management. Instead, the resource host may be provisioned or controlled by other peripheral devices (which may handle operations to configuring resource host network, software installation, security, etc. for operating within provider network 200). In this way the bare metal instance may execute an operating system and applications provided by a client (e.g., by an image) directly on the hardware of the resource host. The virtualization of non-volatile storage devices may be presented to a bare metal instance using the same techniques discussed below for virtual compute instances.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances in virtual compute service 220, or other network-based services 230 in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance in a manner that is transparent to applications implemented on the client 210 utilizing computational resources provided by the compute instance.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
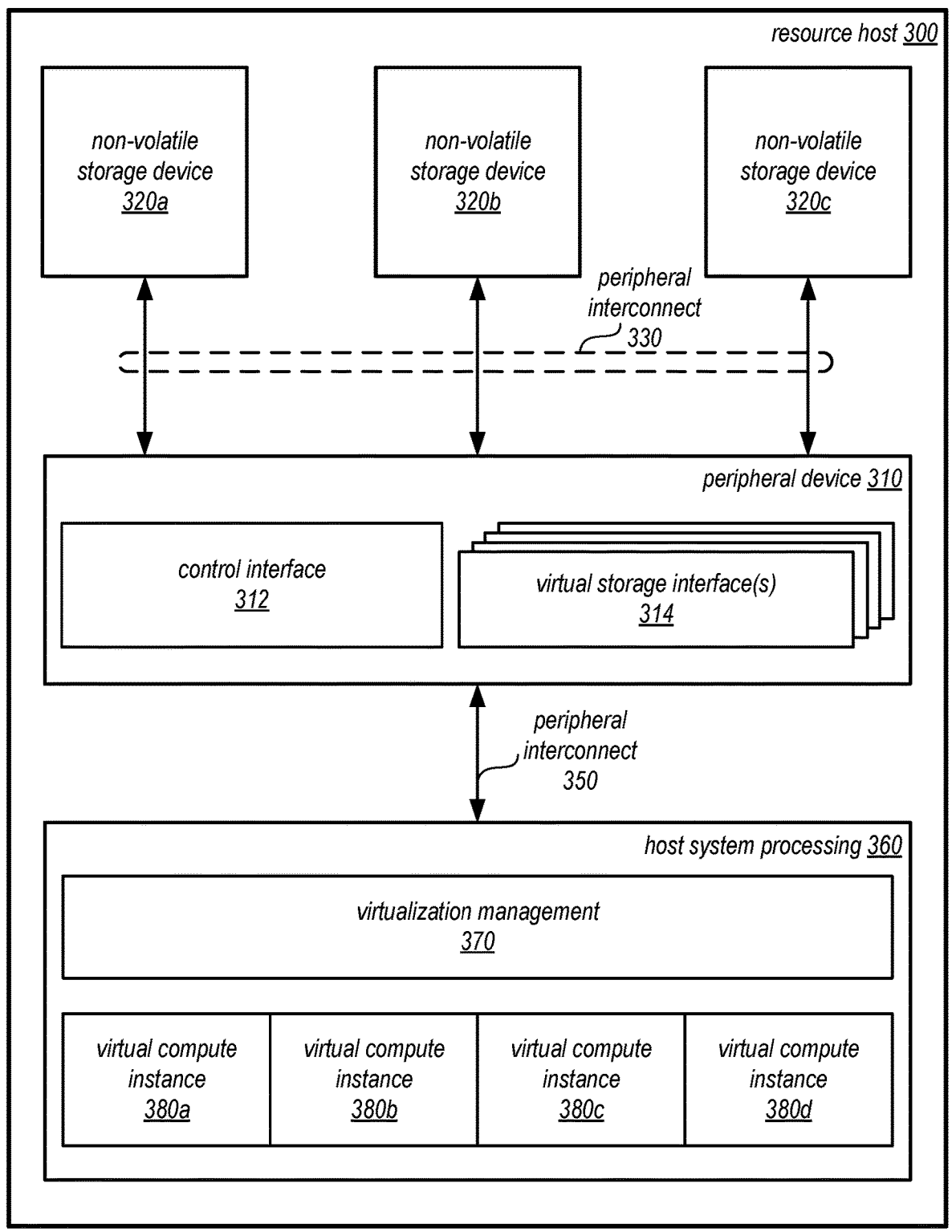
FIG. 3 is a logical block diagram illustrating a resource host that implements a peripheral network processing device that provide virtualization of non-volatiles storage devices connected to the peripheral device at the resource host, according to some embodiments.

FIG. 3 is a logical block diagram illustrating a resource host that implements a peripheral device that provide virtualization of non-volatile storage devices connected to the peripheral device at the resource host, according to some embodiments. Resource host 300 illustrates peripheral device 310 which implements different virtual storage interfaces 314 to provide access to storage partitions of non-volatile storage devices 320 for virtual compute instances 380. As FIG. 3 illustrates, in at least some embodiments of a provider network 200, at least some of the computing resources provided to clients of the provider network 200 may be virtualized computing resources implemented on multi-tenant hardware that is shared with other client(s) and/or on hardware dedicated to the particular client (e.g., virtual compute instance 380a may be hosted for a different client than virtual compute instances 380b, 380c and 380d).

Figure 9:
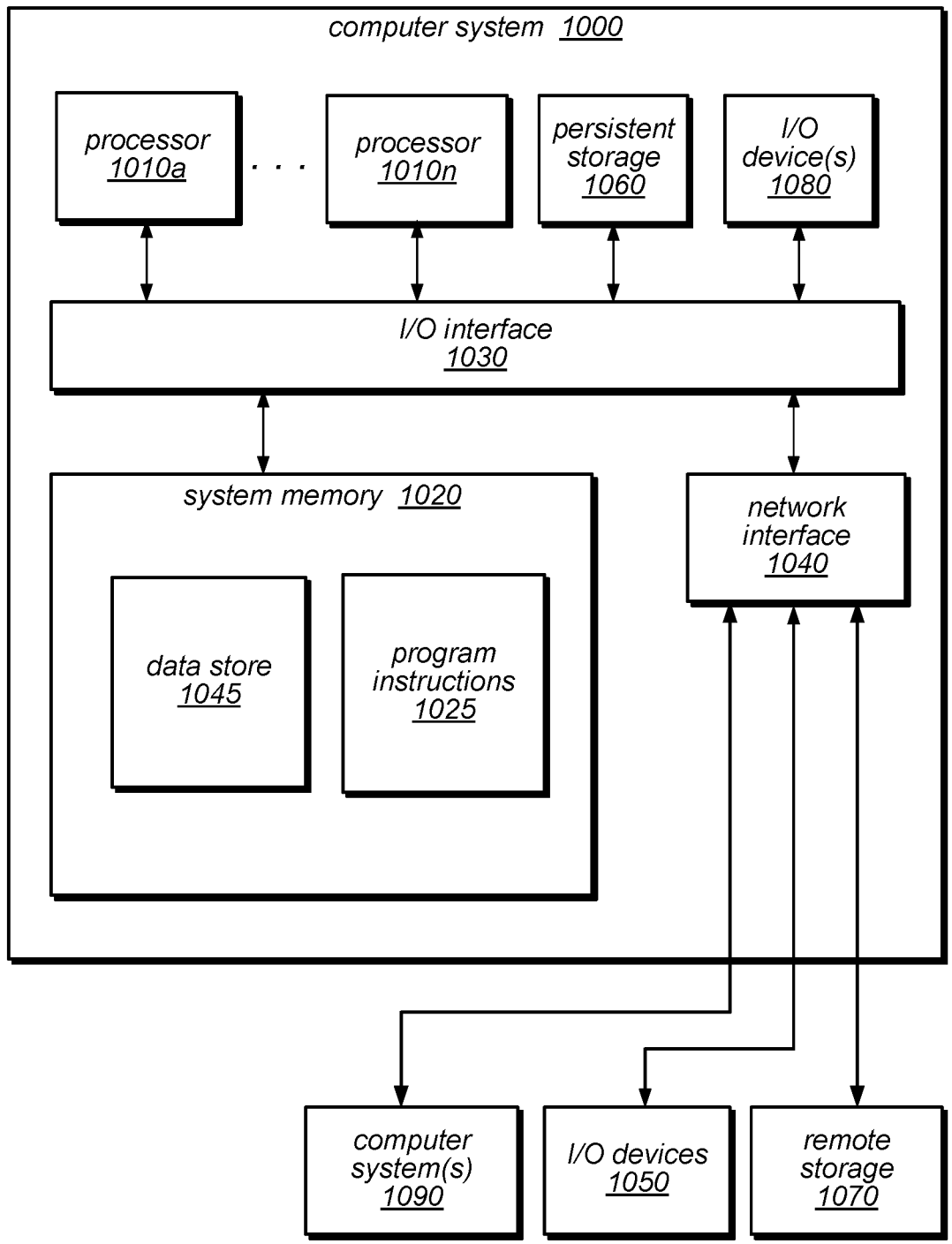
FIG. 9 is a block diagram illustrating an example computing system, according to some embodiments.

At least some of the virtual compute instances 380 on the provider network 200 may be implemented according to hardware virtualization technology that enables multiple operating systems to run concurrently on a host computer, such as resource host 300, i.e. as virtual machines (VMs) on the host. A hypervisor, or virtual machine monitor, domain zero, or other virtualization management 370, on the host 300 presents the virtual compute instances 380 on the respective host 300 with a virtual platform and monitors the execution of the client resource instances 380 on the host 300. Each virtual compute instance 380 may be provided access to a non-volatile storage device 320 by accessing a storage partition allocated for the virtual compute instance 380. As shown in FIG. 3, the virtualization management 370 and client resource instances 380 may be implemented on and executed by host device processing 360 components of the host 300, for example processor(s) and memory implemented by the host 300. FIG. 9 is a block diagram illustrating an example computer system that may be used as a host 300 in some embodiments.

In at least some embodiments, host 300 may include or may be coupled to one or more peripheral device(s) 310 that provide storage virtualization for virtual compute instances 380 on the host 300 and the non-volatile storage devices 320. Peripheral device(s) 310 may connect to and communicate with host system processing 360 according to a peripheral interconnect 350 (which may be any kind of expansion bus standard, such as peripheral component interconnect (PCI), PCI extended (PCI-X), PCI express (PCIe), or accelerated graphics port (AGP)). For example, peripheral network processing device 310 may be a card implementing an Application Specific Integrated Circuit (ASIC), Field Programmable Gate Array (FPGA), or system on chip (SoC) that executes and/or performs the techniques described below with regard to FIGS. 4-8, along with a PCIe interface plugged into a PCIe expansion slot or PCIe bus of the host 300.

Non-volatile storage devices, such as devices 320a, 320b, and 320c, may be flash-based or other random access storage devices that may provide persistent, block-based storage on behalf of clients without using mechanical access mechanisms (e.g., electronic access mechanisms). Solid state drives, for instance, may be non-volatile storage devices, as can be Non-Volatile Dual Inline Memory Modules (NVDIMM) or Battery-Backed Random Access Memory, and thus the previous examples are not intended to be limiting. Non-volatile storage devices may be connected with peripheral device 310 via peripheral interconnect 330 (e.g., peripheral component interconnect (PCI), PCI extended (PCI-X), PCI express (PCIe)). In at least some embodiments, non-volatile storage devices may implement controllers configured to process I/O according to a high-speed interface specification for non-volatile storage devices, such as non-volatile memory express (NVMe).

Peripheral device 310 may implement a control interface 312 to perform to perform various configuration actions with respect to the implementation of storage virtualization. For example, in some embodiments, control interface 312 may be implemented as an SR-IOV physical function to present configuration features and capabilities of non-volatile storage devices 320 to virtualization management 370 to perform various administrative and configuration operations. In addition control interface 312 may also offer custom or specialized controls for the operation of storage virtualization on peripheral device 310. FIG. 4 is a logical block diagram that illustrates control interactions between a host, a peripheral device, and non-volatile storage devices that are virtualized by the peripheral device, according to some embodiments. A control interface, such as control interface 410, may be implemented to provide virtualization management 370 for a resource host with the capability to manage the virtualization of non-volatile storage devices connected to the peripheral device, as well as the operation of the peripheral device. For example, as indicated at 402, virtualization management may submit a request to configure one or more virtual interface(s) 402 on behalf of virtual compute instances executing at a resource host.

Consider the scenario where a new instance is launched. Virtualization management 370 may submit a configuration request 402 to allocate a storage partition at non-volatile storage device, such as storage partition 422. The configuration request may include any information that the peripheral device might need to partition, format, and/or bind storage partition 422. For example, the configuration request 402 may include a partition size or format type for the storage partition. Storage partition binding may be performed late when compared with typical storage partition binding which is directed by an operating system implemented as part of a virtual compute instance. Instead, the control interface 410 for the peripheral device performs 412 the partitioning and formatting of the storage partition according to the configuration request 402 and then attaches or binds the storage partition to a virtual interface that has been launched/created/instantiated for the new storage partition (e.g., virtual interface 432 bound 440 to storage partition 422). Similarly, a configuration request 402 may release, reclaim, and/or unbind a storage partition for a virtual compute instance. For example, a virtual compute instance directing requests to virtual interface 434 may shutdown. Virtualization management 370 may send a request 402 to reclaim storage partition 424 (e.g., reformat or make available for creating a new storage partition), unbind virtual interface 434 from storage partition 424, and shutdown or halt virtual interface 434. Configuration request 402 may also be used to set up a new virtual interface for a new instance at a resource host. For example, storage virtualization at the peripheral device may create or instantiate a new SR-IOV virtual function that mirrors the I/O features of non-volatile storage devices which may hold a storage partition that is to be bound to the virtual function.

Virtualization management 370 may also perform various other requests. For example, virtualization management 370 may submit a request 404 to get device information collected at the peripheral device. Although virtualization at a peripheral device may be implemented as a stateless application, various different metrics, logs, or other information about the peripheral device itself or non-volatile storage devices may be periodically pushed or requested from the peripheral device. For example, hardware performance metrics for components of the peripheral device, such as CPU or memory may be collected, as well as health information about the non-volatile storage devices, such as Self-Monitoring, Analysis and Reporting Technology (SMART) data. In response to retrieving this information, the host system may evaluate and/or trigger alarms or events based on the received information (e.g., failure indications for non-volatile storage devices).

Virtualization management 370 may also be able to configure the operation of various features of storage virtualization at the peripheral device, such as enabling, disabling, or otherwise configuring encryption or throttling per virtual interface. For example, encryption configuration request 406 may provide a key for one virtual interface, such as virtual interface 434, while another encryption configuration request may provide a different key for virtual interface 432. Similarly, throttle configuration request 408 may specify a throttle threshold for access requests for a virtual interface (including different ones for different virtual interfaces, in some embodiments). Virtualization management 370 may also initiate live firmware updates 414 for storage a virtualization application at the peripheral device, as discussed below with regard to FIG. 8, to provide a live update to storage virtualization without disabling non-volatile storage devices or a resource host. Please note that configuration interface 412 may be able to receive and response to a variety of different configuration commands and therefore the previous examples are not intended to be limiting as to the other types of requests that can be handled via control interface 412.

Turning back to FIG. 3, peripheral device may also implement different virtual interfaces 314 that are bound to respective storage partitions on behalf of different virtual compute instances. In this way, isolation between compute instances may be maintained without the awareness of the compute instances. For instance, a virtual instance may be presented with a virtual interface as would a controller for a non-volatile storage device 320 to a virtual compute instance. Encryption and/or throttling may also be implemented on a per-virtual interface basis, expanding the features that an individual virtual interface may provide to an instance.

In at least some embodiments, virtual interfaces may provide a mirror or subset of the non-volatile memory express (NVMe) interface. FIGS. 5 and 6 provide example virtualizations of NVMe at a peripheral device. FIG. 5 is a logical block diagram that illustrates processing a request to write data via a virtual interface implemented at a peripheral device for a virtual compute instance, according to some embodiments. Host physical memory 500 may be one or more memory devices implemented at a resource that are utilized to provide physical address space for a virtual compute instance, such as instance memory space 510. As part of implementing a driver or mechanism for communication with non-volatile storage device 550, an operating system for the virtual compute instance may create an I/O submission queue 514 within instance memory space 510 as well as I/O completion queue 516. In this way, a pair of submission and completion entries (entry 524 and entry 526) may be created and obtained as part of executing an I/O request. In FIG. 5, the virtual compute instance may create entry 524 indicating a request to write data 522. The entry 524 may include a link or pointer to write data 522 in a separate data buffer 512 also instantiated in memory space 510.

The virtual compute instance may then send an indication of the I/O submission entry 570 to virtual interface 530 in a same manner as if virtual interface 530 were a controller for non-volatile storage device 550. For example, the indication 570 may be a write to a doorbell register in a bar by means of a direct memory access 502 to the register at the peripheral device for virtual interface 530 (e.g., by utilizing an Input/Output Memory Management Unit (IOMMU)). An event may be triggered in response to the write to the doorbell registered and the event placed in a ring buffer (which may be accessed to evaluate the event for processing). Virtual interface 530 may implement I/O throttle 533 in some embodiments, which may determine whether or not the I/O request for the indicated event will be throttled (e.g., according to a throttle threshold as discussed below with regard to FIG. 7). If not throttled, then virtual interface 530 may get 572 the I/O submission 524 entry via direct memory access 502 and get 574 the write data 522 pointed to by the entry 524 via direct memory access 502.

In at least some embodiments, virtual interface 530 may implement encryption engine 531 (which may be software and/or hardware implementation that applies one or more encryption schemes to data received for virtual interface 530. In this way, encryption may be performed in-line as part of virtualization at the peripheral device. The encrypted data may be written 576 to a data buffer 535 maintained in virtual interface 530. Virtual interface may then create 578 a corresponding entry 544 in I/O submission queue 537 that points to encrypted write data 542 (e.g., to an address range in buffer 535). Virtual interface 530 may then perform the physical write request by indicating an I/O submission entry 580 to a controller for non-volatile storage device 550. Note that I/O submission queue 537 and I/O completion queue 539 may be shared amongst multiple virtual interfaces, in some embodiments, that submit entries for performance by the same non-volatile storage device (e.g., storage device 550). Like indication 570 discussed above, indication 580 may be a write via direct memory access 504 to a doorbell register for the controller at non-volatile storage device 550. The controller may then detect an event triggered by the doorbell register and get the I/O submission entry 582. The I/O submission entry may indicate the request to write encrypted write data 542 to a storage partition 560 in non-volatile storage device 550. The controller may get the write data 584 from the data buffer 535 (as pointed to by entry 544) and store encrypted write data 542 in storage partition 560. The controller may then write the completion entry 586 to I/O completion queue 539. Virtual interface 530 may detect the presence of I/O completion entry 546 in I/O completion queue 539 and write a corresponding completion entry 526 in I/O completion queue 516. The writing of entry 526 may trigger a Message Signal Interrupt (MSI) which may notify the virtual compute instance that the write request is complete.

Figure 5:
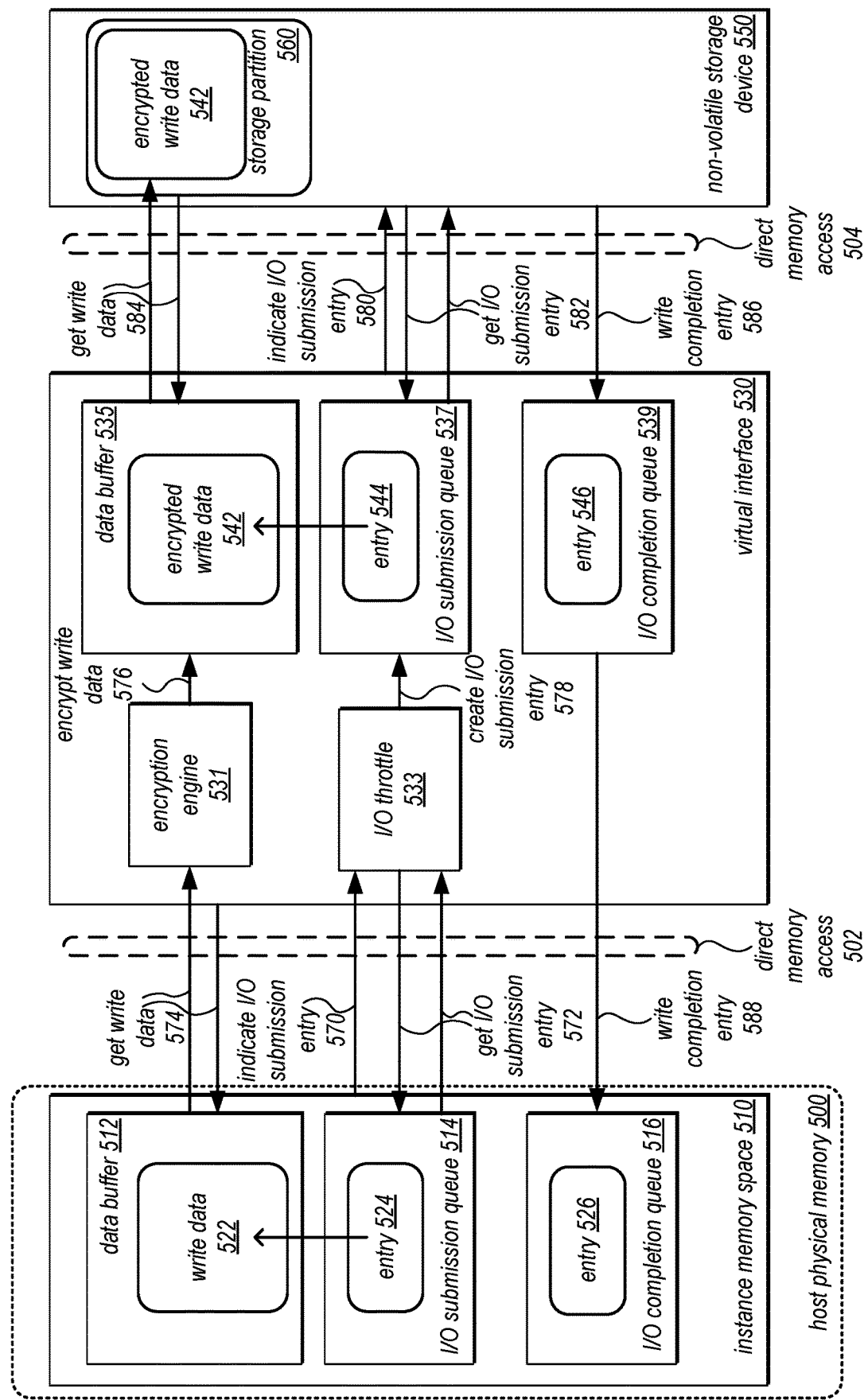
FIG. 5 is a logical block diagram that illustrates processing a request to write data via a virtual interface implemented at a peripheral device for a virtual compute instance, according to some embodiments.
Figure 6:
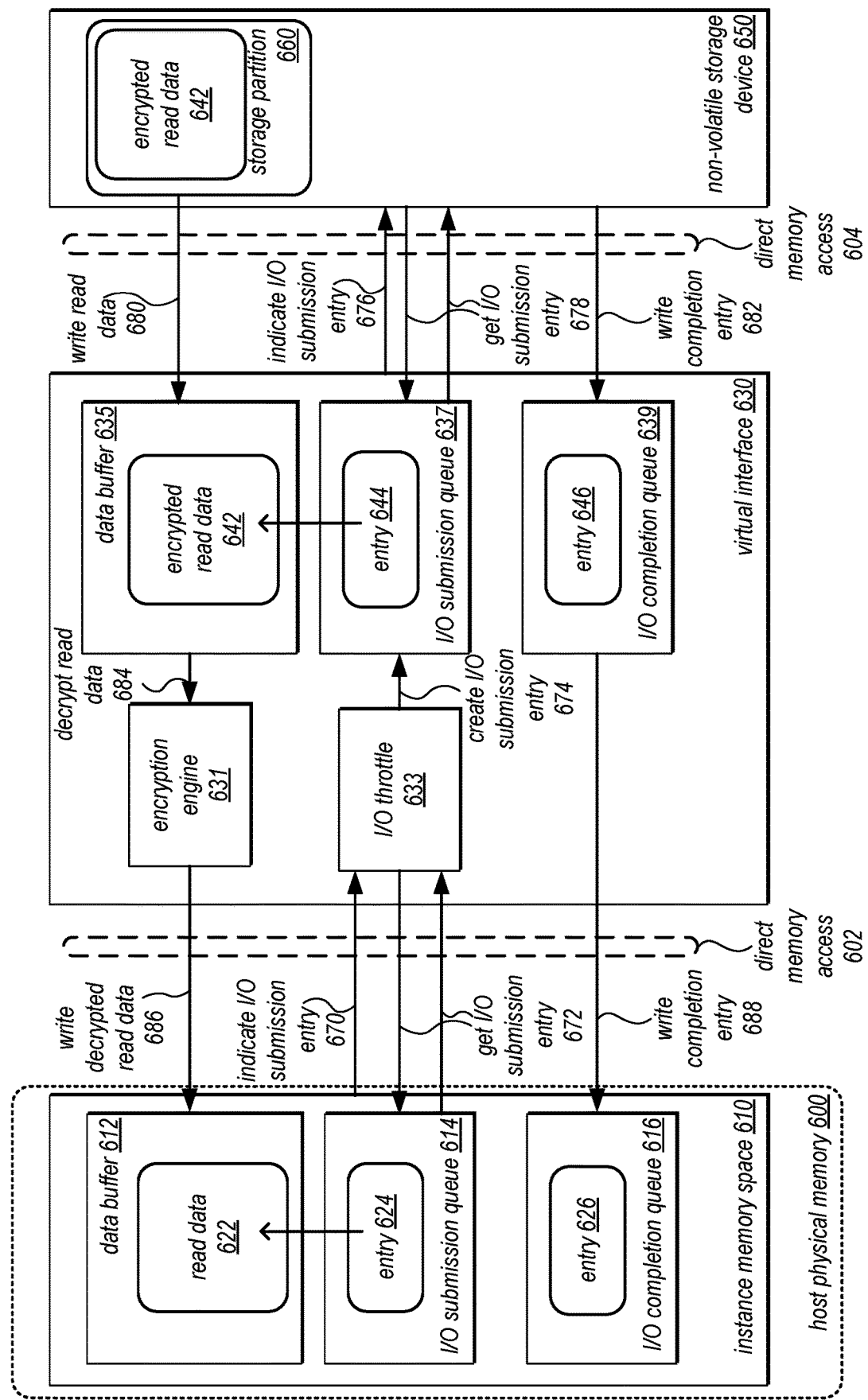
FIG. 6 is a logical block diagram that illustrates processing a request to read data via a virtual interface implemented at a peripheral device for a virtual compute instance, according to some embodiments.

FIG. 6 is a logical block diagram that illustrates processing a request to read data via a virtual interface implemented at a peripheral device for a virtual compute instance, according to some embodiments. As with FIG. 5, above, host physical memory 600 may be one or more memory devices implemented at a resource that are utilized to provide physical address space for a virtual compute instance, such as instance memory space 610. As part of implementing a driver or mechanism for communication with non-volatile storage device 650, an operating system for the virtual compute instance may create an I/O submission queue 614 within instance memory space 610 as well as I/O completion queue 616. In this way, a pair of submission and completion entries (entry 624 and entry 626) may be created and obtained as part of executing an I/O request. In FIG. 6, the virtual compute instance may create entry 624 indicating a request to read data from storage partition 660 in non-volatile storage device 650.

The virtual compute instance may then send an indication of the I/O submission entry 670 to virtual interface 630 in a same manner as if virtual interface 630 were a controller for non-volatile storage device 650. For example, the indication 670 may be a write to a doorbell register in a bar by means of a direct memory access 602 to the register at the peripheral device for virtual interface 630. An event may be triggered in response to the write to the doorbell registered and the event placed in a ring buffer (which may be accessed to evaluate the event for processing). Virtual interface 630 may implement I/O throttle 633 in some embodiments, which may determine whether or not the I/O request for the indicated event will be throttled (e.g., according to a throttle threshold as discussed below with regard to FIG. 7). If not throttled, then virtual interface 630 may get 672 the I/O submission 624 entry via direct memory access 602.

Virtual interface 630 may then create 674 a corresponding entry 644 in I/O submission queue 637. Note that I/O submission queue 637 and I/O completion queue 639 may be shared amongst multiple virtual interfaces, in some embodiments, that submit entries for performance by the same non-volatile storage device (e.g., storage device 650). Virtual interface 630 may then perform the physical read request by indicating an I/O submission entry 676 to a controller for non-volatile storage device 650. Like indication 670 discussed above, indication 676 may be a write via direct memory access 604 to a doorbell register for the controller at non-volatile storage device 650. The controller may then detect an event triggered by the doorbell register and get the I/O submission entry 678. The I/O submission entry may indicate the request to read encrypted read data 642 from storage partition 660 in non-volatile storage device 650. The controller may then write 680 data 642 from storage partition 660 to a location in data buffer 635. The controller may then write 682 the completion entry 646 to I/O completion queue 639.

Virtual interface 630 may detect the presence of I/O completion entry 646 in I/O completion queue 639 provide the read data to the virtual compute instance. For example, in at least some embodiments, virtual interface 630 may implement encryption engine 631 (which may be software and/or hardware implementation that applies one or more encryption schemes to data received for virtual interface 630). In this way, encryption may be performed in-line as part of virtualization at the peripheral device. The encrypted data 642 may be read from data buffer 635 maintained in virtual interface 630 and decrypted 684 at encryption engine 631 according to a same encryption scheme used to encrypt the data. Virtual interface 630 may then write 686 the decrypted data 622 to data buffer 612 via direct memory access 602. Virtual interface 630 may then write 688 a corresponding completion entry 626 in I/O completion queue 616 which points to the location in data buffer 612 of the data read from storage partition 660. The writing of entry 626 may trigger a Message Signal Interrupt (MSI) which may notify the virtual compute instance that the read request is complete.

Please note that FIGS. 5 and 6 describe examples of processing access requests for a virtual interface like NVMe. Other processing techniques or components could be adapted to perform virtualization of non-volatile storage devices for interface specifications that are different than NVMe. Moreover, the features included in a virtual interface, such as encryption or throttling may be implemented differently, or other features or modifications to the data may be implemented. For example, in some embodiments, in addition to or instead of encryption, compression techniques may be applied to the data transparently. Data that is received from the host may be written in compressed form to the non-volatile storage device. Similarly, when data is retrieved from the non-volatile storage device the data may be decompressed before being provided to the host via the virtual interface.

Figure 7:
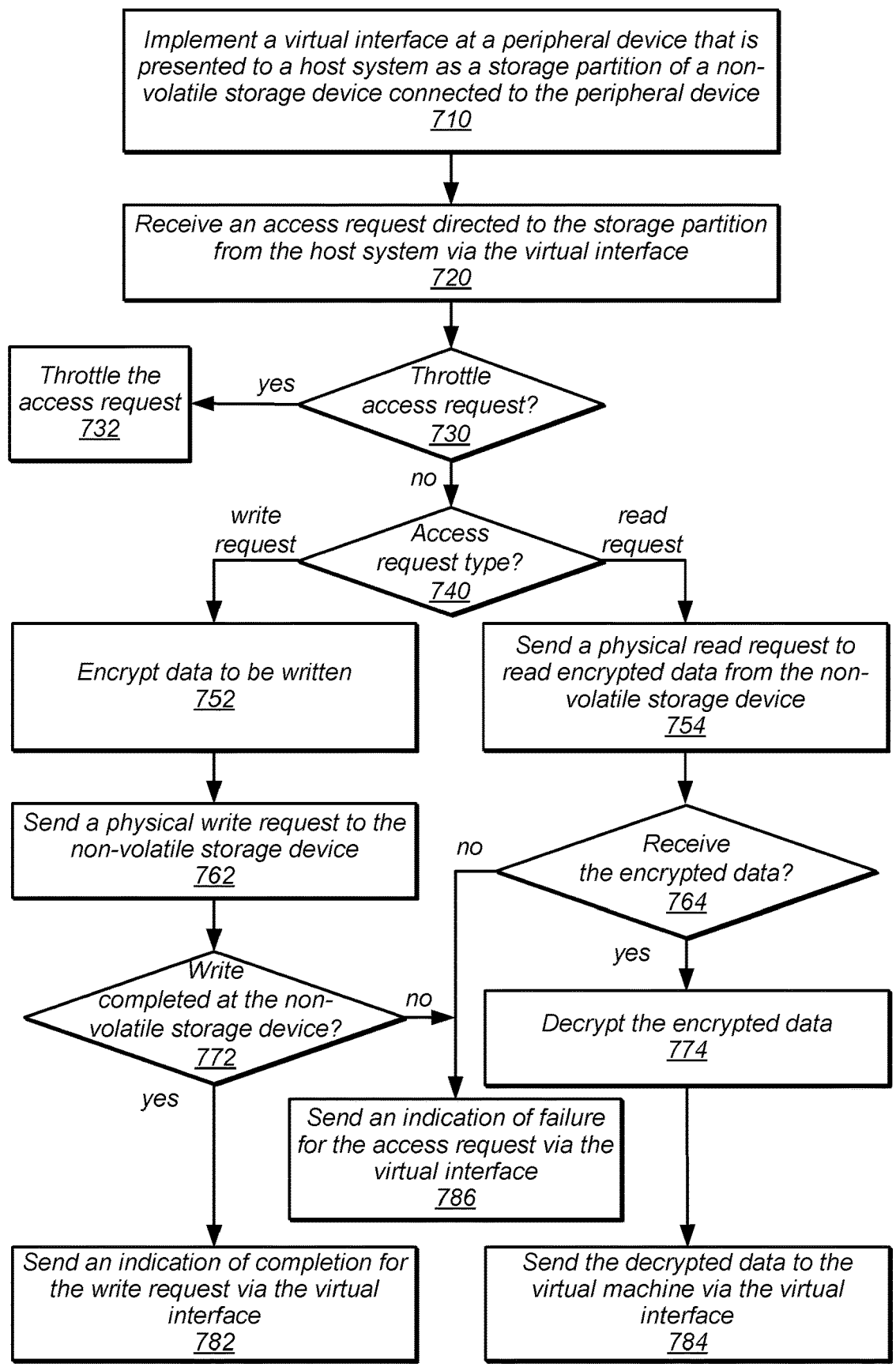
FIG. 7 is a high-level flowchart illustrating various methods and techniques virtualizing non-volatile storage devices at a peripheral device, according to some embodiments.

The examples of virtualizing non-volatile storage at a peripheral device as discussed above with regard to FIGS. 2-6 have been given in regard to a peripheral device connected to a resource host in a provider network. Various other types or configurations of host systems or peripheral devices with capability of connecting to non-volatile storage devices and a host may implement these techniques. Moreover, different configurations of the various modules, components, systems, and or services described above that may implement virtualizing non-volatile storage at a peripheral device. FIG. 7 is a high-level flowchart illustrating various methods and techniques virtualizing non-volatile storage devices at a peripheral device, according to some embodiments. These techniques may be implemented by peripheral devices, as described above with regard to FIGS. 2-6.

As indicated at 710, a virtual interface may be implemented at a peripheral device that is presented to a virtual machine operating at a host system or directly to the host system (e.g., running as "bare metal" instance or workload as discussed above with regard to FIG. 2 without any virtual machines or instances operating at the host system) as a storage partition of a non-volatile storage device connected to the peripheral device, in various embodiments. The virtual interface may mirror or nearly-mirror an interface specification for accessing non-volatile memory storage devices, such as NVMe, such that the virtual machine is agnostic to the implementation of the peripheral device (but instead acts as though the virtual interface where a controller for the non-volatile storage device).

As indicated at 720, an access request directed to the storage partition from the virtual machine via the virtual interface may be received. Throttling may be implemented in some embodiments, as indicated at 730. For example a throttle threshold (e.g., a rate limit or request limit) may be implemented for the storage partition that throttles access requests received in excess of the throttle threshold, as indicated at 732, by delaying processing of the access request until capacity within the throttle threshold to process the access request becomes available (e.g., by implementing a token bucket technique) In some embodiments, throttle thresholds may be configured or set for individual virtual interfaces, so that the access requests rate permitted for one storage partition may be higher or lower than another storage partition for another virtual machine (e.g., as one type of virtual compute instance may have a higher I/O bandwidth offering than another type of virtual compute instance). The throttle threshold may be configured via a control interface, as discussed above with regard to FIG. 4.

Different types of access requests may be processed differently, in some embodiments, as indicated at 740. For example, an encryption scheme may be applied to data stored for the virtual machine, so as indicated at 752, the data to be written to the non-volatile storage device as part of a request to write the data to the storage partition may be encrypted. Various kinds of encryption schemes may be implemented (e.g., including symmetric key encryption, public-private key encryption, etc.). In some embodiments, encryption may be performed by an encryption engine at the peripheral device which may be implemented in dedicated circuitry. An encryption key may be provided to the encryption engine as part of configuring encryption for the virtual interface, as discussed above at FIG. 4. Like throttling, a different encryption scheme can be implemented for each storage partition (e.g., by utilizing different keys). The encryption keys may not be persistently maintained at the peripheral device or the non-volatile storage device, in some embodiments, but instead may be maintained by the host system.

Once encrypted a physical write request is generated and sent to the non-volatile storage device to write the data (or if encryption is not performed the original data is written), as indicated at 762. For example, a direct memory access is performed to write a doorbell register for a controller at the non-volatile storage device indicating the physical write request to be performed. The controller at the non-volatile storage device may then complete the write request or fail to complete the write request, as indicated at 772. If the physical write request fails, then as indicated at 786, an indication of the failure of the access request may be sent to the virtual machine or host system via the virtual interface. An interrupt or other signal (e.g., in a message signal interrupt (MSI) vector written to the host's interrupt controller). If the write request is successfully completed, then an indication of completion for the write request may be sent via the virtual interface, as indicated at 782. Similarly, an interrupt or other signal may be provided back to the virtual machine instance via the interface which indicates successful completion of the write request.

A read request may be processed differently than a write request, in various embodiments. For example, as indicated at 754, a physical read request may be generated and sent to the non-volatile storage device to read data from the non-volatile storage device. The data may be encrypted according to an encryption scheme performed at the peripheral device when the data was stored (as discussed above with regard to element 752). If the read request was unsuccessful and the data was not received, then as indicated by the negative exit from 764, an indication of failure for the access request may be sent via the virtual interface, as indicated at 786. If the data is received, then the data may be decrypted according to a same encryption scheme as was applied to encrypt the data, as indicated at 774. For example, the key applied by the encryption engine for the virtual interface may be retrieved from memory and utilized to decrypt the data read from the non-volatile storage device. If encryption is not performed, then element 774 may be skipped. Once decrypted, the decrypted data may be sent to the virtual machine via the virtual interface, as indicated at 784. For example, the decrypted data may be written to a buffer in the memory space of the virtual machine by direct memory access and a doorbell register written to signal completion of the read request.

Note that in addition to or instead of encryption discussed above, other data modifications may be performed that are transparent to the host system/virtual machines. For example, compression schemes may be implemented to reduce the size of data that is stored at rest. A lossless compression scheme, for instance, such as run-length encoding or Lempel-Ziv, can be implemented so that data is returned to the host system or virtual machine without any change or data loss that occurs as a result of the compression, saving storage space on the non-volatile device without sacrificing data. Other data encoding techniques (e.g., converting data from one format into another) may be similarly implemented.

Figure 8:
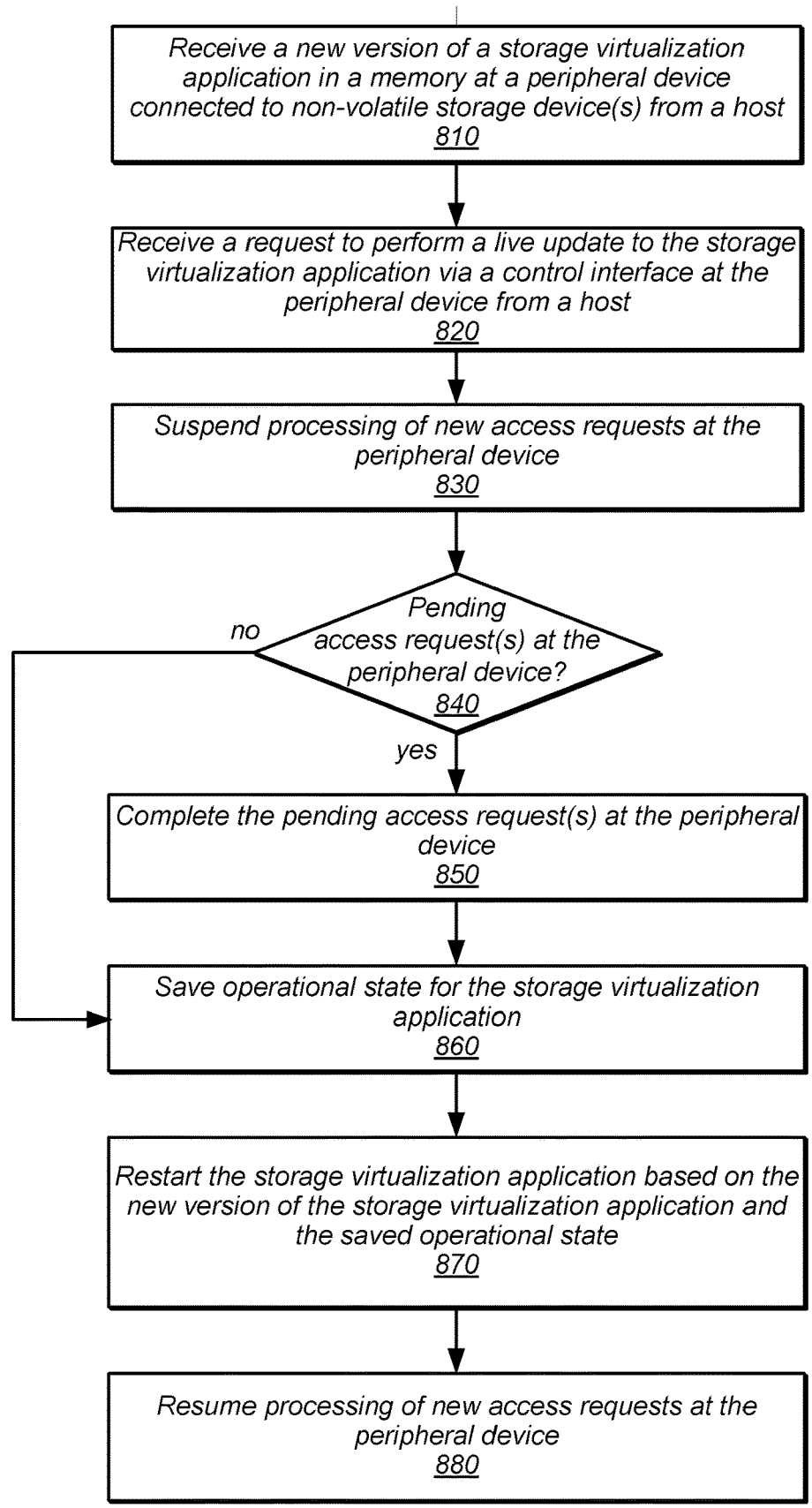
FIG. 8 is a high-level flowchart illustrating various methods and techniques for performing a live update to a storage virtualization application at a peripheral device, according to some embodiments.

Virtualization of non-volatile storage devices often occurs in dynamic environments. Provider networks, such as provider network 200 discussed above in FIG. 2, may be constantly making software or hardware changes across various systems to ensure that resources offered by the provider network adapt to changes in or provide improvements to performance of resources. For a peripheral device providing storage virtualization for non-volatile storage devices, new non-volatile storage devices may be added that utilize a different driver or interface to store data may be installed or additional capabilities may be added (e.g., control capabilities like adding additional information that can be retrieved from the peripheral device). To account for these changes, a change or update to the storage virtualization application (e.g., firmware stored in a memory device on the peripheral device) may be necessitated. While updating applications typically involves a shutdown of one or more of the host system, non-volatile storage devices, or peripheral device, a live update to the peripheral device would minimize disruption to virtual machine, host, storage, and peripheral device operations while still obtaining the features that installing a new version of the storage virtualization application provides. FIG. 8 is a high-level flowchart illustrating various methods and techniques for performing a live update to a storage virtualization application at a peripheral device, according to some embodiments.

A new version of a storage virtualization application may be received at a memory at the peripheral device connected to non-volatile storage device(s), as indicated at 810. For example, a storage location in the memory may be pre-defined or agreed upon (e.g., according to a specification for the storage virtualization application) that identifies the storage location in the memory at the peripheral device as allocated for receiving a new version of firmware. The host system may utilize direct memory access techniques (as discussed above) to write the new version into the storage location. Once written, the host system may send a request to the peripheral device to perform a live update to the new version of the storage virtualization application.

The peripheral device may receive the request to perform the live update via a control interface implemented at the peripheral device, as indicated at 820. In response to receiving the live update request, the peripheral device may suspend processing of new access requests at the peripheral device, as indicated at 830, in various embodiments. For example, the peripheral device may ignore doorbell register triggered events and not retrieve new entry submissions from I/O submission queues at the host. If pending access requests are at the peripheral device, as indicated by the positive exit from 840, then the pending access request(s) may be completed at the peripheral device. For example, entries in the I/O submission queue(s) for the different virtual interfaces may be completed, as well as the submission queue for the control interface. The peripheral device may also save, write, or otherwise store operational state for the storage virtualization application in a location that is persisted during a restart of the virtualization application, as indicated at 860. For example, operational state may include, but are not limited to, virtual machine visible artifacts such as registers or configuration information for the storage partitions, as well as information that affects virtual machine visible state, such as pending in-flight I/O.

A memory location outside of the address space allocated to the storage virtualization application may store the operational state.

As indicated at 870, the storage virtualization application may be restarted, in various embodiments, based on the new version of the storage version application in the memory and the saved operational state. For instance, virtual interfaces may be re-instantiated and bound to the appropriate storage partitions, and other configuration information, such as may be included in the operational state, may be used to reset the state of the new version of the storage virtualization application to match the state of the prior version of the storage virtualization application at the time the live update was initiated. Once restarted, processing of new access requests may resume at the peripheral device, as indicated at 880.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Embodiments of virtualizing non-volatile storage at a peripheral device may be executed on one or more computer systems, which may interact with various other devices. FIG. 9 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard (e.g., PCIe) or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
at least one processor and a memory storing program instructions that when executed by the at least one processor cause the at least one processor to implement a host system;
a peripheral device, connected to the host system at a bus implemented at the host system, wherein the peripheral device is further connected to one or more storage devices via respective buses for the one or more storage devices that are separate from the bus implemented at the host system;
the peripheral device, configured to:
execute a storage virtualization application stored in a memory at the peripheral device;
perform an update to the executing storage virtualization application, wherein to perform the update to the executing storage virtualization application, the peripheral device is configured to:
  suspend processing of new access requests at the peripheral device;
  save operational state for the executing storage virtualization application;
  restart the executing storage virtualization application based on a new version of the storage virtualization application, stored in the memory at the peripheral device, and the saved operational state; and
  resume processing of new access requests at the peripheral device according to the new version of the storage virtualization application.

2. The system of claim 1, wherein the peripheral device is further configured to receive a request to perform the update to the storage virtualization application from the host system via a control interface implemented at the peripheral device for the host system, wherein the update to the storage virtualization system is performed responsive to the request.

3. The system of claim 1, wherein the peripheral device is further configured to perform the update to the storage virtualization application by completing one or more access requests pending at the peripheral device.

4. The system of claim 1, wherein the update to the storage virtualization application is performed without disabling the one or more storage devices or the host system.

5. The system of claim 1, wherein the host system is configured to write the new version of the storage application to the memory at the peripheral device via a direct memory access channel.

6. The system of claim 1, wherein restarting the storage virtualization application comprises resetting a state of the new version of the storage virtualization application to match a state of a prior version of the storage virtualization application at a time the performance of the update was initiated.

7. The system of claim 1, wherein the host system implements a virtual compute instance and is part of a network-based virtual computing service that offers different types of virtual compute instances to clients of the network-based virtual computing service, wherein the storage virtualization application implements a virtual interface configured to receive I/O requests from the virtual compute instance for the one or more storage devices.

8. A method, comprising:
  performing, by a peripheral device, an update to a storage virtualization application stored in a memory at the peripheral device and executed by the peripheral device, wherein the peripheral device is connected to a host system and one or more storage devices, and wherein performing the update comprises:
    suspending processing of new access requests at the peripheral device;
    saving operational state for the storage virtualization application;
    restarting the storage virtualization application based on a new version of the storage virtualization application stored in the memory and the saved operational state; and
    resuming processing of new access requests at the peripheral device.

9. The method of claim 8, further comprising receiving, at the peripheral device, a request to perform the update to the storage virtualization application from the host system via a control interface implemented at the peripheral device for the host system, wherein the update to the storage virtualization system is performed responsive to the request.

10. The method of claim 8, wherein performing the update further comprises completing one or more access requests pending at the peripheral device.

11. The method of claim 8, wherein the update to the storage virtualization application is performed without disabling the one or more storage devices or the host system.

12. The method of claim 8, further comprising:
  writing, by the host system, the new version of the storage application to the memory at the peripheral device via a direct memory access channel.

13. The method of claim 8, wherein restarting the storage virtualization application comprises resetting a state of the new version of the storage virtualization application to match a state of a prior version of the storage virtualization application at a time the performance of the update was initiated.

14. The method of claim 8, wherein the host system implements a virtual compute instance and is part of a network-based virtual computing service that offers different types of virtual compute instances to clients of the network-based virtual computing service, wherein the storage virtualization application implements a virtual interface configured to receive I/O requests from the virtual compute instance for the one or more storage devices.

15. A peripheral device connected to a host system and one or more storage devices, wherein the peripheral device executes a storage virtualization application stored in a memory at the peripheral device, and wherein the peripheral device is configured to:
  perform an update to the storage virtualization application by:
    suspending processing of new access requests at the peripheral device;
    saving operational state for the storage virtualization application;
    restarting the storage virtualization application based on a new version of the storage virtualization application stored in the memory and the saved operational state; and
    resuming processing of new access requests at the peripheral device.

16. The peripheral device of claim 15, wherein the peripheral device is further configured to receive a request to perform the update to the storage virtualization application from the host system via a control interface implemented at the peripheral device for the host system, wherein the update to the storage virtualization system is performed responsive to the request.

17. The peripheral device of claim 15, wherein the peripheral device is further configured to perform the update to the storage virtualization application by completing one or more access requests pending at the peripheral device.

18. The peripheral device of claim 15, wherein the update to the storage virtualization application is performed without disabling the one or more storage devices or the host system.

19. The peripheral device of claim 15, wherein restarting the storage virtualization application comprises resetting a state of the new version of the storage virtualization application to match a state of a prior version of the storage virtualization application at a time the performance of the update was initiated.

20. The peripheral device of claim 15, wherein the storage virtualization application implements a virtual interface configured to receive I/O requests from a virtual compute instance implemented at the host system for the one or more storage devices.

* * * * *